US011606544B2

(12) United States Patent
Yue et al.

(10) Patent No.: US 11,606,544 B2
(45) Date of Patent: Mar. 14, 2023

(54) NEURAL NETWORK BASED AUTO-WHITE-BALANCING

(71) Applicant: Black Sesame International Holding Limited, San Jose, CA (US)

(72) Inventors: Jiaju Yue, San Jose, CA (US); Donghui Wu, San Mateo, CA (US); Bin Chen, San Jose, CA (US); Chao Wang, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 133 days.

(21) Appl. No.: 17/341,628

(22) Filed: Jun. 8, 2021

(65) Prior Publication Data

US 2022/0394223 A1 Dec. 8, 2022

(51) Int. Cl.
*H04N 9/73* (2006.01)
*G06T 5/00* (2006.01)
(Continued)

(52) U.S. Cl.
CPC .............. *H04N 9/735* (2013.01); *G06T 5/003* (2013.01); *G06T 5/40* (2013.01); *G06T 7/80* (2017.01);
(Continued)

(58) Field of Classification Search
CPC ........... H04N 5/23229; H04N 5/23225; H04N 9/3182; H04N 9/735; G06T 5/40
See application file for complete search history.

(56) References Cited

U.S. PATENT DOCUMENTS 7,184,080 B2 * 2/2007 Kehtarnavaz .......... H04N 9/735
382/167
7,576,797 B2 * 8/2009 Kehtarnavaz .......... H04N 9/735
348/229.1
(Continued)

FOREIGN PATENT DOCUMENTS

CN 106412547 A * 2/2017 ............... H04N 9/73
CN 107578390 A * 1/2018
(Continued)

*Primary Examiner* — John Villecco
(74) *Attorney, Agent, or Firm* — Timothy T. Wang; Ni, Wang & Massand, PLLC (57) ABSTRACT

A method of auto white balancing, including, receiving an original image, determining an RG logarithmic ratio of a set of red to green channel values of the original image, determining a BG logarithmic ratio of a set of blue to green channel values of the original image, determine an original two-dimensional histogram utilizing the RG logarithmic ratio and the BG logarithmic ratio, determine a Gaussian-blur two-dimensional histogram utilizing the RG logarithmic ratio and the BG logarithmic ratio, determining a sharpened two-dimensional histogram of a sharpened image utilizing the RG logarithmic ratio and the BG logarithmic ratio, determining a Laplacian-edge two-dimensional histogram of a Laplacian-edge image utilizing the RG logarithmic ratio and the BG logarithmic ratio and determining a white balancing gain utilizing a neural network based on the original 2D histogram, the Gaussian-blur 2D histogram, the sharpened 2D histogram and the Laplacian-edge 2D histogram.

10 Claims, 8 Drawing Sheets

(51) Int. Cl.
*G06T 7/80* (2017.01)
*G06T 5/40* (2006.01)
*H04N 5/232* (2006.01)

(52) U.S. Cl.
CPC ..... *H04N 5/23225* (2013.01); *H04N 5/23229* (2013.01); *G06T 2207/10024* (2013.01); *G06T 2207/20084* (2013.01)

(56) References Cited

U.S. PATENT DOCUMENTS

| | | | |
|---|---|---|---|
| 9,336,582 B1* | 5/2016 | Barron | G06T 5/20 |
| 9,672,604 B2* | 6/2017 | Barron | G06T 5/009 |
| 10,530,995 B2* | 1/2020 | Douady-Pleven | G06T 5/009 |
| 10,791,310 B2* | 9/2020 | Nikkanen | H04N 9/735 |
| 11,218,630 B2* | 1/2022 | Douady | H04N 1/6008 |
| 11,457,191 B2* | 9/2022 | Uzunov | H04N 5/235 |
| 2005/0286097 A1* | 12/2005 | Hung | H04N 1/608 |
| | | | 358/509 |
| 2008/0101690 A1* | 5/2008 | Hsu | H04N 9/735 |
| | | | 382/162 |
| 2017/0237961 A1* | 8/2017 | Barron | G06T 5/001 |
| | | | 348/223.1 |
| 2018/0367774 A1* | 12/2018 | Barron | G06T 5/001 |
| 2021/0160470 A1* | 5/2021 | Afifi | H04N 9/73 |
| 2021/0266507 A1* | 8/2021 | Watanabe | G06V 10/82 |
| 2021/0360179 A1* | 11/2021 | Dangi | G06T 5/007 |

FOREIGN PATENT DOCUMENTS

| | | | |
|---|---|---|---|
| CN | 112102192 A | * | 12/2020 |
| JP | 2020077950 A | * | 5/2020 |
| WO | WO-2021204202 A1 | * | 10/2021 |

* cited by examiner

NEURAL NETWORK BASED AUTO-WHITE-BALANCING

BACKGROUND

Technical Field

The instant disclosure is related to auto white balancing and more specifically to neural network based auto white balancing.

Background

Currently, auto-white-balance methods utilize different mathematic models to estimate color temperature. In real-life images there is usually a mixture of lighting conditions, for example, an image having objects reflecting sun light, in shade and some utilizing an artificial light source. This mixture of environmental lighting sources cannot be accurately described with current models. Additionally current auto-white-balance methods do not correct for sensor variations from camera to camera.

SUMMARY

A method of auto white balancing, including, receiving an original image, determining an RG logarithmic ratio of a set of red channel values (R) to a set of green channel values (G) of the original image, determining a BG logarithmic ratio of a set of blue channel values (B) to the set of green channel values (G) of the original image, determining an original two-dimensional (2D) histogram of the original image utilizing the RG logarithmic ratio and the BG logarithmic ratio, determining a Gaussian-blur two-dimensional (2D) histogram of a Gaussian-blur image of the original image utilizing the RG logarithmic ratio and the BG logarithmic ratio, determining a sharpened two-dimensional (2D) histogram of a sharpened image of the original image utilizing the RG logarithmic ratio and the BG logarithmic ratio, determining a Laplacian-edge two-dimensional (2D) histogram of a Laplacian-edge image of the original image utilizing the RG logarithmic ratio and the BG logarithmic ratio and determining a white balancing gain utilizing a neural network based on the original 2D histogram, the Gaussian-blur 2D histogram, the sharpened 2D histogram and the Laplacian-edge 2D histogram.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
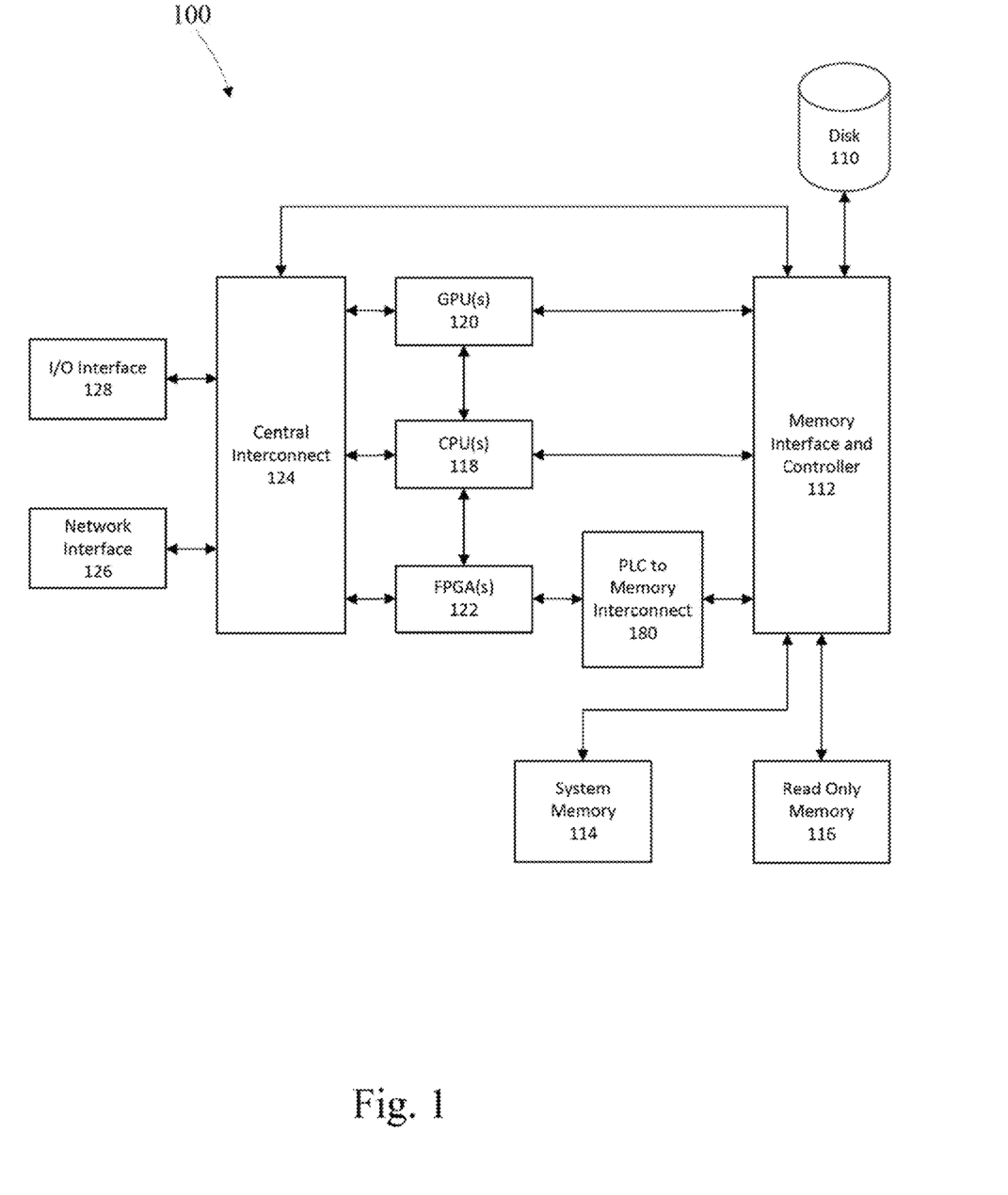
FIG. 1 is a first example system diagram in accordance with one embodiment of the disclosure.

FIG. 1 depicts an example hybrid computational system 100 that may be used to implement neural nets associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
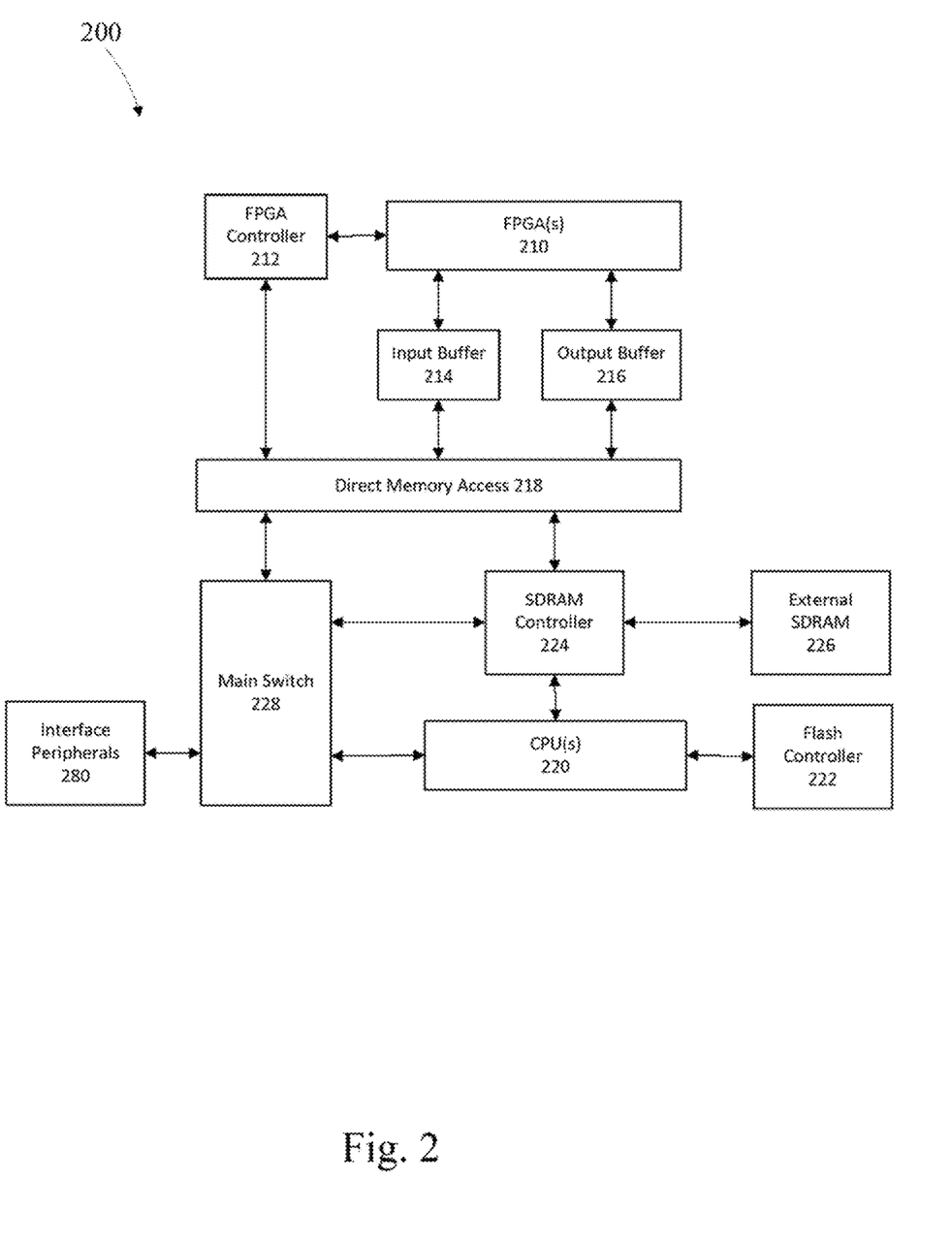
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Figure 3:
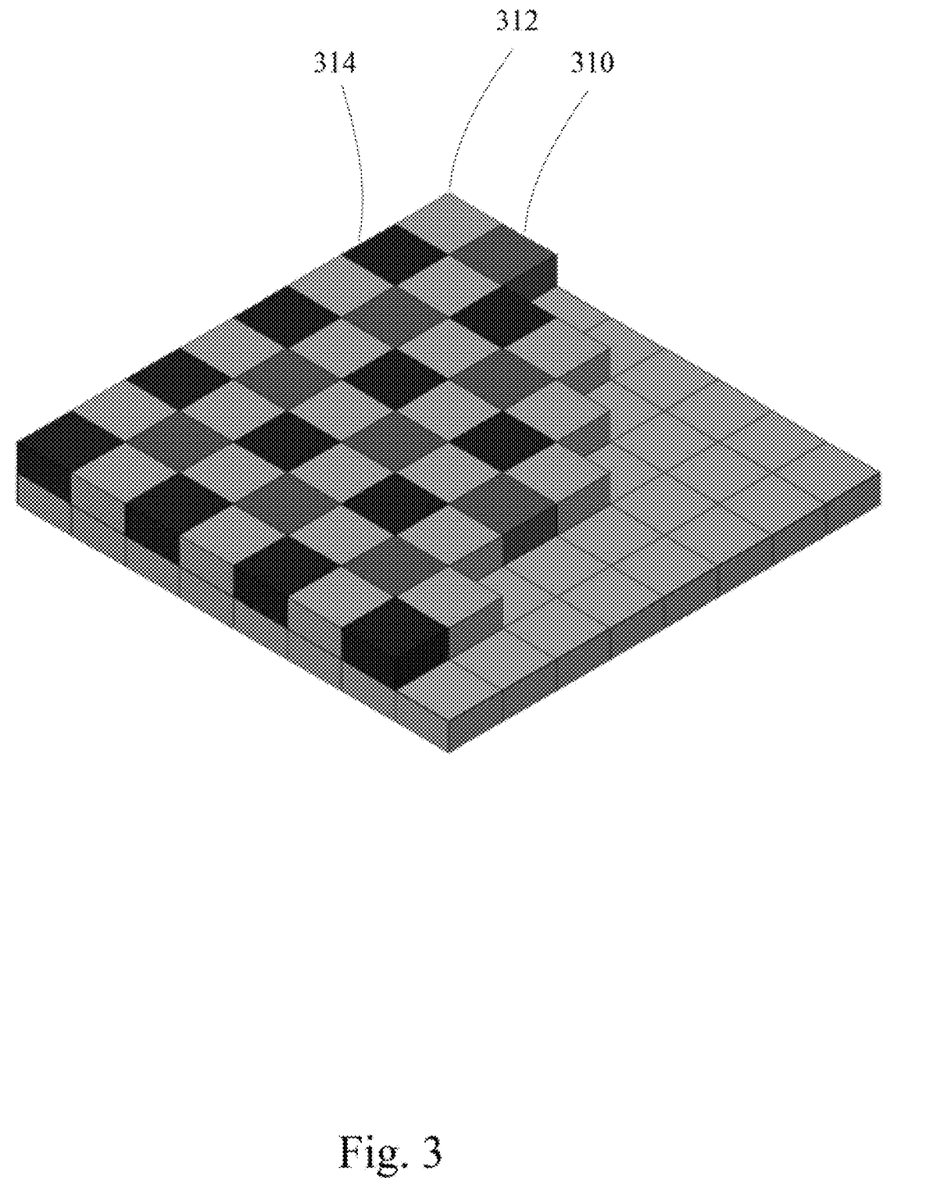
FIG. 3 is an example of 2×2 Bayer pattern.

Image signal processing (ISP) converts sensor raw data to a color image. Sensor raw data has an unbalanced red blue green (RGB) channel due to the sensor being covered with color filters in a 2×2 Bayer Pattern as shown in FIG. 3. The RGB pattern shown includes a red (R) 310, two greens (G) 312 and a blue (B) 314.

In a system utilizing a Bayer-Pattern the system is unable to determine the true color of the image because of the unbalanced channels. In white or grey, the RGB channels are equal. But in a pre-auto-white-balance unbalanced image, the white color may exhibit a greenish tint. Auto-white-balance corrects the unbalanced channels by applying three (3) different gains to the RGB channels, to make the image look white.

Currently, auto-white-balance may be divided into at least two main stages, color temperature estimation and gain. The color temperature estimation may be considered as the environmental lighting condition. Different color temperatures cause a difference in light color.

Figure 4:
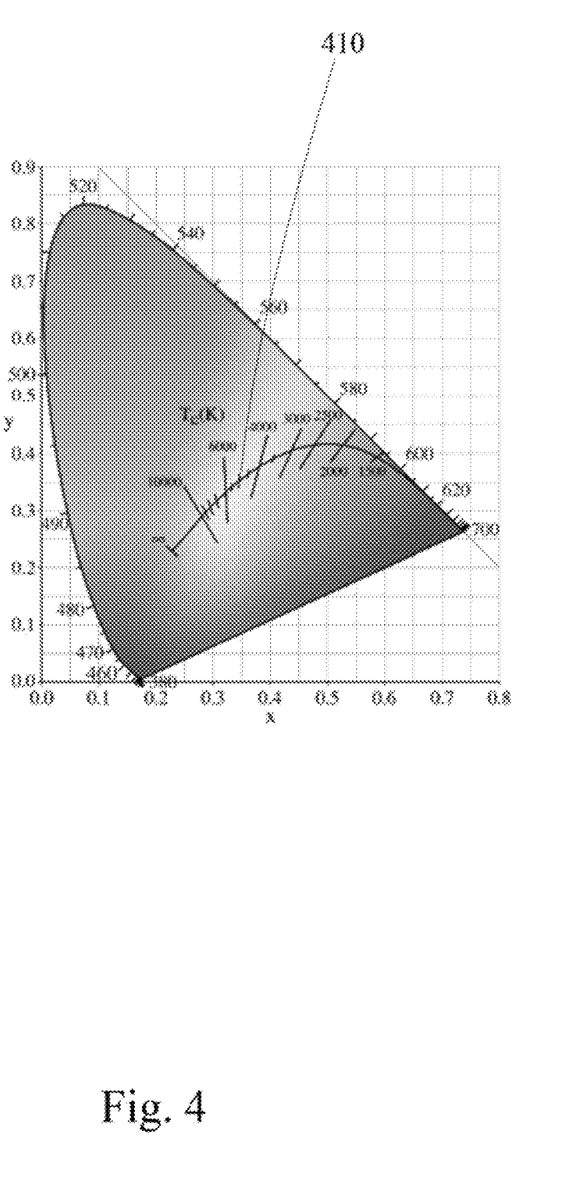
FIG. 4 is an example of a color temperature Plank curve.

FIG. 4 depicts the color changing along a color temperature curve, called a Plank curve. The Plank curve indicates the white object's reflection color, which is called the white point 410.

Currently, there are no accurate mathematical models to describe the real-life scenes for an auto-white-balancing. One possible example solution method is statistically based and involves deep learning and neural networks.

Figure 5:
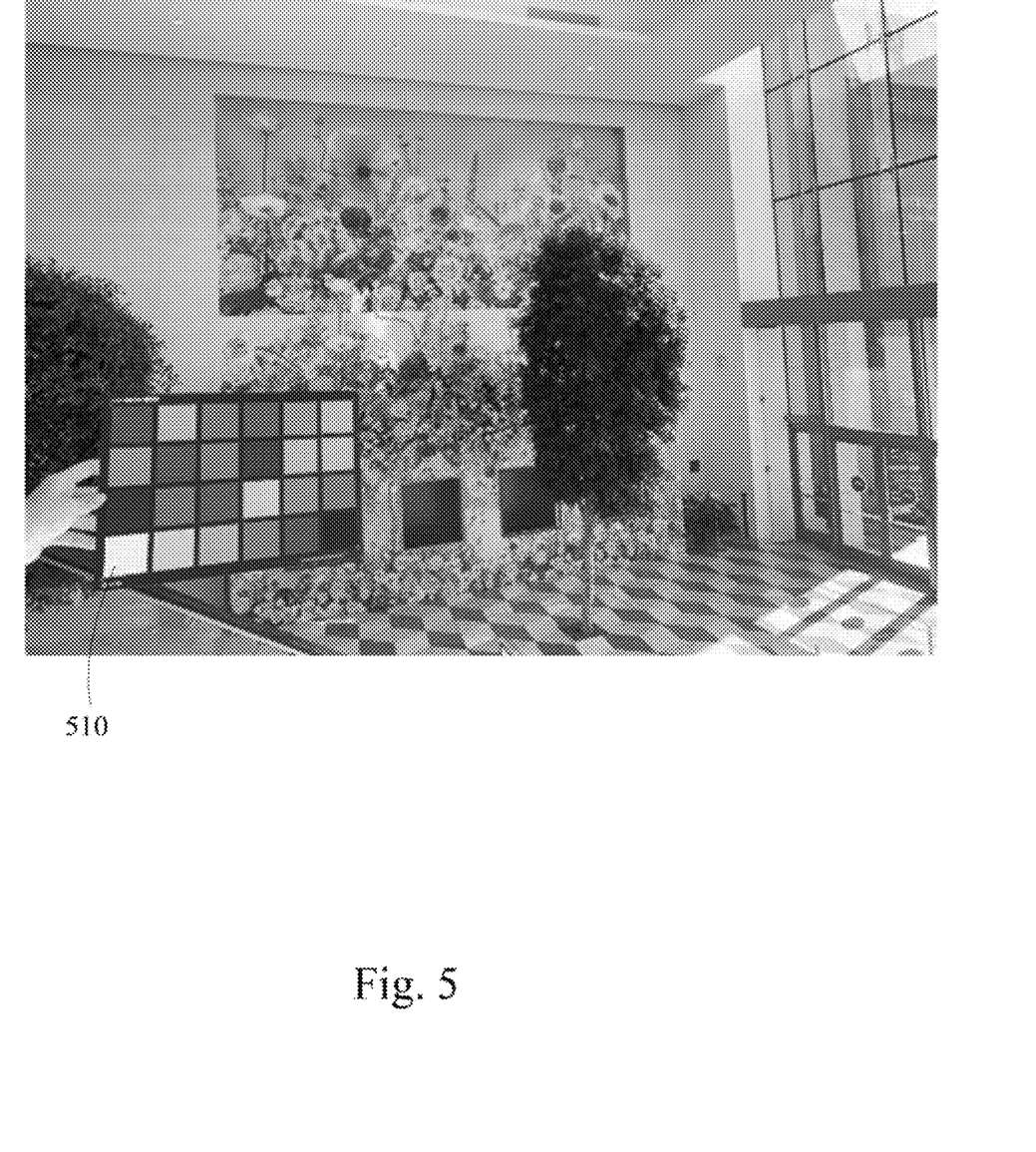
FIG. 5 is an example of a training data scene in accordance with one embodiment of the disclosure.

In one example, training images utilized were linear raw images taken directly from an image sensor without any pre-processing. In one example over four hundred images of real scenes were captured. In this example a color checker was captured with the scene to measure the ground truth. The ground truth may be obtained by measuring patches from black to white 510 as shown in FIG. 5.

The inputs to the neural network are two-dimensional (2D) histograms of various aspects of the images. A logarithm ratio of the red (R) channel to the green (G) channel and a logarithm ratio of the blue (B) channel to the green (G) channel were input to the neural network. In this example, the axes had 256 bins. Four, two-dimensional histograms were determined based on, the original image, a Gaussian-blur image, a sharpened image, and a Laplacian edge image.

Figure 6:
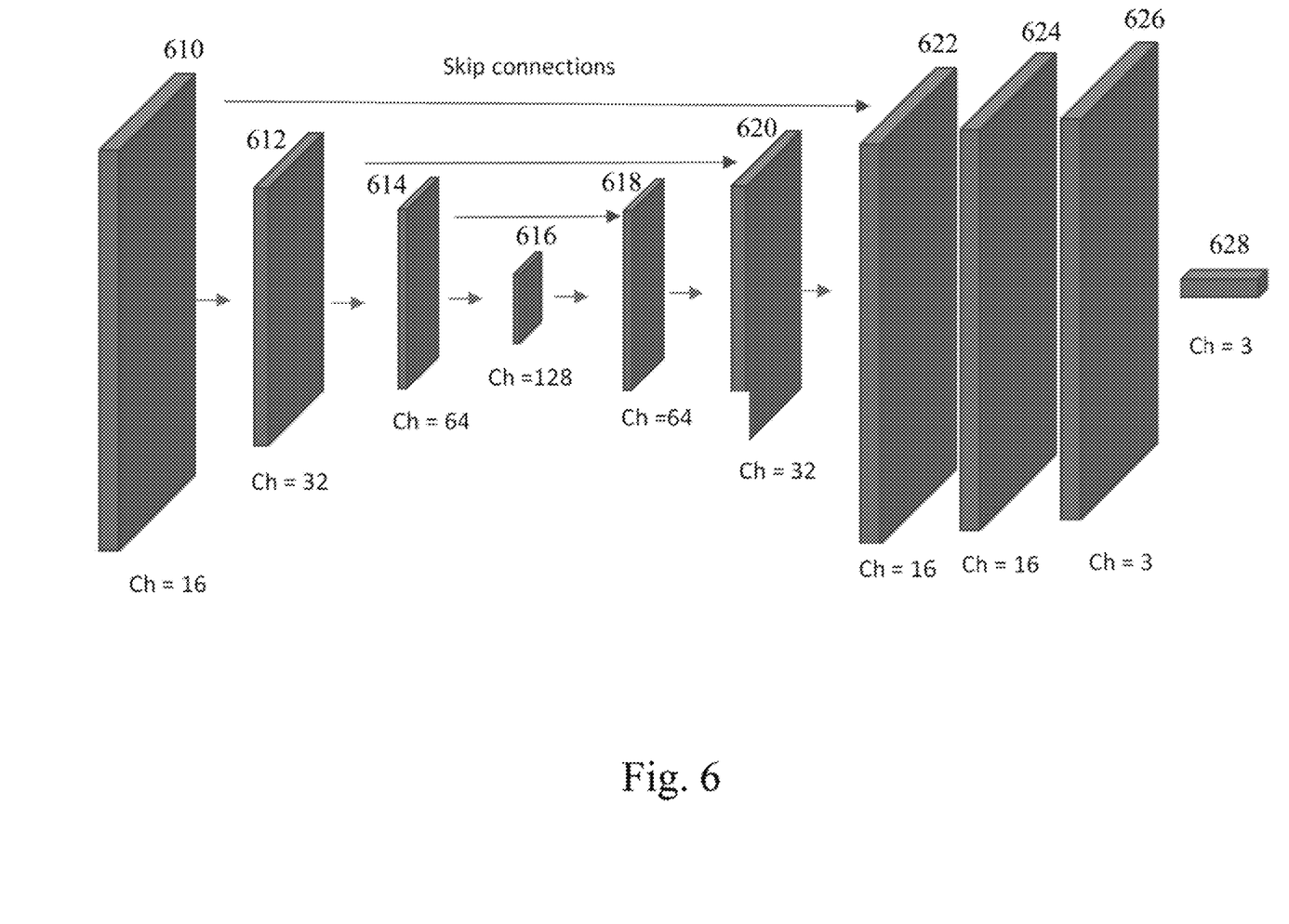
FIG. 6 is an example of a U-Net neural network to find auto-white balancing in accordance with one embodiment of the disclosure.

FIG. 6 depicts an example neural network implemented as a U-Net structure. The U-net has three down-sampling layers using max pooling and skip connections. The final layer is a 256×256 fully connected layer, which outputs the white balancing gain. The activation functions are ReLU in U-net and leaky-ReLU with an alpha of 0.125 in the fully connected layer. Down conversion layer 1 610 has 16 channels, leading to down conversion layer 2 612 having 32 channels, down conversion layer 3 has 64 channels and down conversion layer 4 616 has 128 channels. Up conversion layer 1 618 has 64 channels, up conversion layer 2 620 has 32 channels, up conversion layer 3 622 has 16 channels. Layer 4 624 has 16 channels, layer 5 626 has 3 channels and fully connected layer 628 has 3 channels.

Figure 7:
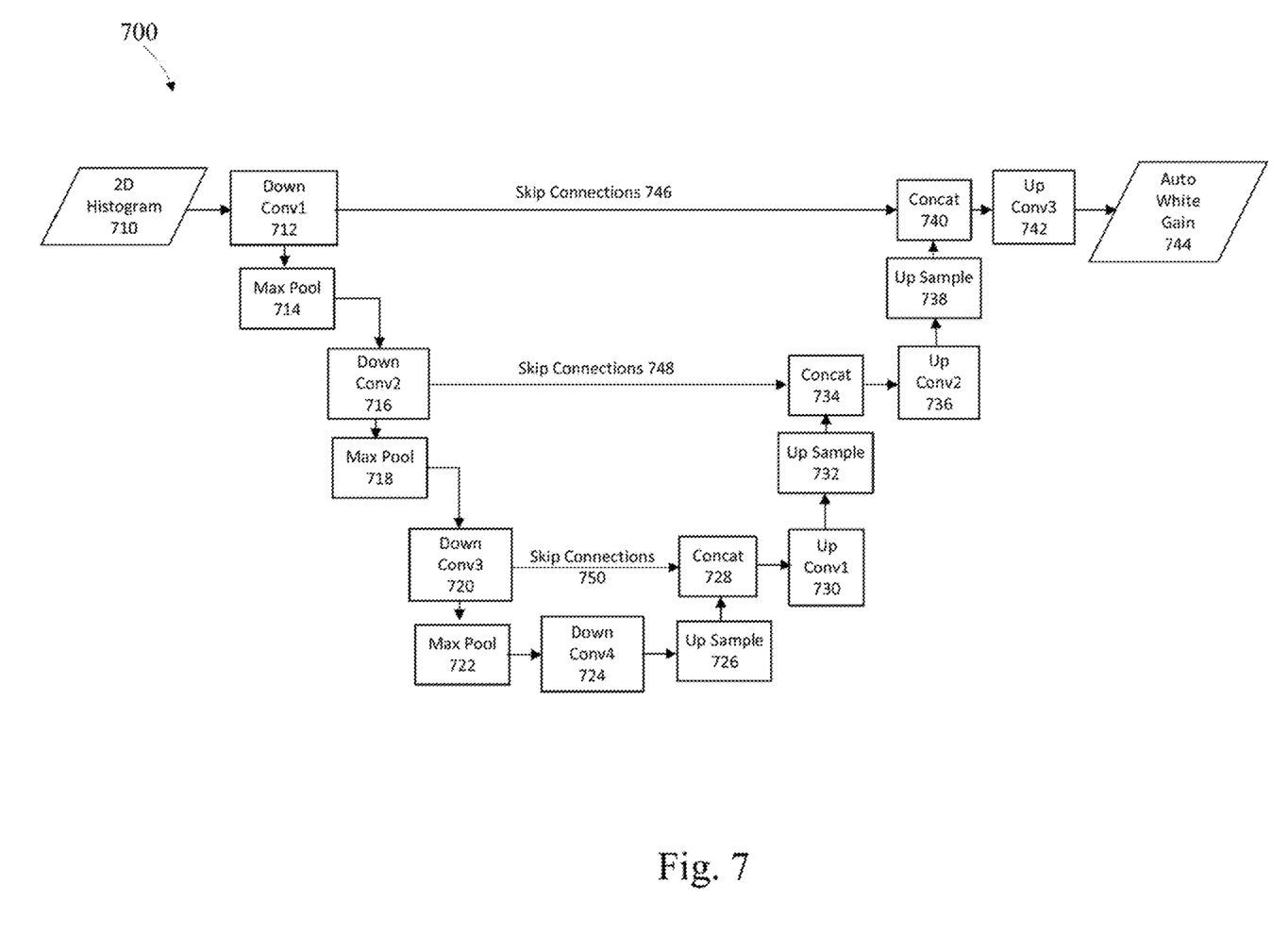
FIG. 7 is another example of a U-Net neural network to find auto-white balancing in accordance with one embodiment of the disclosure.

FIG. 7 depicts a second example U-Net structure 700. A two-dimensional histogram 710 is input to a first down conversion layer 712 and outputs to a first max pool layer 714. The first max pool layer 714 inputs to a second down conversion layer 716, and outputs to a second max pool layer 718. The second max pool layer 718 outputs to a third down conversion layer 720 which outputs to a third max pool layer 722. The third max pool layer 722 outputs to a fourth down conversion layer 724 which outputs to a first up sample layer 726. The first up sample layer 726 outputs to a first concatenation layer 728. The third down conversion layer 720 may skip connect 750 to the first concatenation layer 728. The first concatenation layer 728 outputs to a first up conversion layer 730, which outputs to a second up sample layer 732. The second up sample layer 732 outputs to a second concatenation layer 734. The second down conversion layer 716 may skip connect 748 to second concatenation layer 734. The second concatenation layer 734 outputs to a second up conversion layer 736 which itself outputs to a third up sample layer 738. The third up sample layer 738 outputs to a third concatenation layer 740. The First down conversion layer 712 may be skip connected 746 to the third concatenation layer 740. The third concatenation layer 740 outputs to a third up conversion layer 742 which itself outputs an auto-white gain 744.

The U-Net supplements a contracting network by successive layers, where pooling operations are replaced by up-sampling operators, thus increasing the output resolution. The U-Net has multiple feature channels in the up-sampling portion, allowing the network to propagate context to higher resolution layers. The expansion path and contraction paths are approximately symmetric and yield a U-shaped architecture. Border image prediction is based on extrapolation of a mirrored input image.

There are many different image sensors on the market. Each sensor has a different hardware module which has its own characteristics, including a spectrum response, quantum efficiency, a lens specification and pixel and circuit design. This differentiation of sensors makes implementation of a single model difficult.

An example solution may mitigate the output variations from various sensors. The raw data used to train the system was linear raw data. A linear transform may relate the output of sensor A and sensor B through calibration. In one example a measurement was performed for 120 color patches and a linear regression was determined to provide a 3×3 transformation matrix.

By using a 3×3 transformation matrix, one image sensor may be utilized to train the model and apply to other sensors by applying the calibrated 3×3 matrix. Therefore, the training may be performed on one image sensor and applied through a transformation matrix to another image sensor.

The network utilized is lightweight, thus reducing the workload of the hardware. Also, a leaky-ReLU function with an alpha of 0.125 with a power of 2 is utilized. The dataset used to train the process is utilized in a raw pre-processed form provided by in one example, a cell phone image sensor. The example methods utilized for auto-white-balancing is statistical and deep learning based. The neural network is capable of modeling complex responses without the need for an initial mathematical description.

Figure 8:
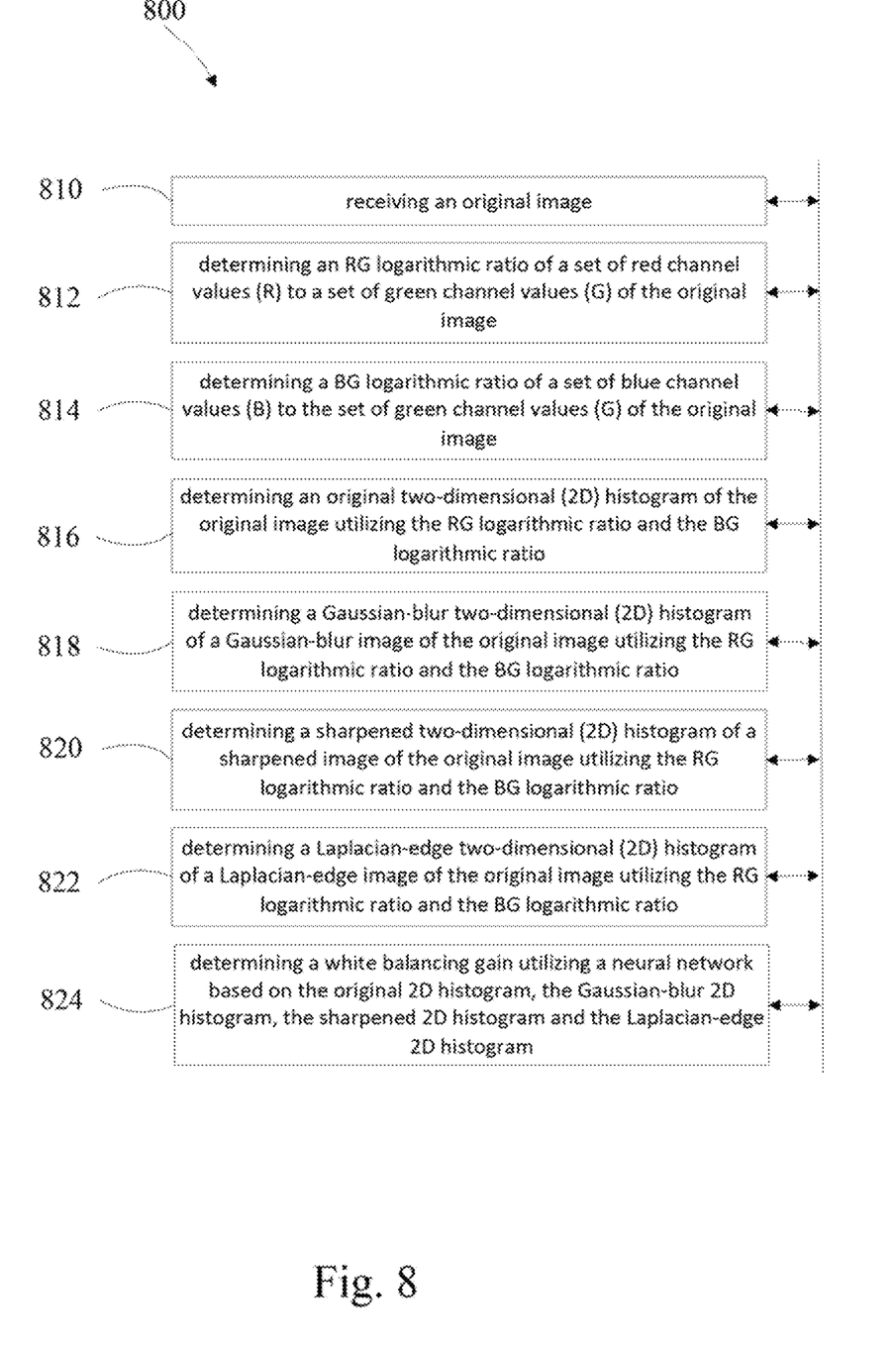
FIG. 8 is an example method of auto-white balancing in accordance with one embodiment of the disclosure.

FIG. 8 depicts an example method of auto white balancing, including, receiving 810 an original image, determining 812 an RG logarithmic ratio of a set of red channel values (R) to a set of green channel values (G) of the original image and determining 814 a BG logarithmic ratio of a set of blue channel values (B) to the set of green channel values (G) of the original image. The method also includes determining 816 an original two-dimensional (2D) histogram of the original image utilizing the RG logarithmic ratio and the BG logarithmic ratio and determining 818 a Gaussian-blur two-dimensional (2D) histogram of a Gaussian-blur image of the original image utilizing the RG logarithmic ratio and the BG logarithmic ratio. The method further includes determining 820 a sharpened two-dimensional (2D) histogram of a sharpened image of the original image utilizing the RG logarithmic ratio and the BG logarithmic ratio, determining 822 a Laplacian-edge two-dimensional (2D) histogram of a Laplacian-edge image of the original image utilizing the RG logarithmic ratio and the BG logarithmic ratio and determining 824 a white balancing gain utilizing a neural network based on the original 2D histogram, the Gaussian-blur 2D histogram, the sharpened 2D histogram and the Laplacian-edge 2D histogram.

The training may be performed by neural network using a ground truth patch array. The method may include calibrating a new sensor to the original image utilizing a transformation matrix based on a linear regression of the new sensor to the original image and calibrating a new sensor to an original sensor utilized to take the original image utilizing a transformation matrix based on a linear regression of the new sensor to the original sensor and training the neural network using a mobile device camera. The original image may be a linear raw image.

The original 2D histogram, the Gaussian-blur 2D histogram, the sharpened 2D histogram and the Laplacian-edge 2D histogram may have 256 bins in both dimensions. The neural network last layer may be a fully connected 256 by 256 later that outputs the white balancing gain. The neural network activation functions may be ReLU, the neural network fully connected layer may have leaky ReLU having an alpha of 0.125 and the neural network may be a U-Net.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of auto white balancing, comprising:
   receiving an original image;
   determining an RG logarithmic ratio of a set of red channel values (R) to a set of green channel values (G) of the original image;
   determining a BG logarithmic ratio of a set of blue channel values (B) to the set of green channel values (G) of the original image;
   determining an original two-dimensional (2D) histogram of the original image utilizing the RG logarithmic ratio and the BG logarithmic ratio;
   determining a Gaussian-blur two-dimensional (2D) histogram of a Gaussian-blur image of the original image utilizing the RG logarithmic ratio and the BG logarithmic ratio;
   determining a sharpened two-dimensional (2D) histogram of a sharpened image of the original image utilizing the RG logarithmic ratio and the BG logarithmic ratio;
   determining a Laplacian-edge two-dimensional (2D) histogram of a Laplacian-edge image of the original image utilizing the RG logarithmic ratio and the BG logarithmic ratio; and
   determining a white balancing gain utilizing a neural network based on the original 2D histogram, the Gaussian-blur 2D histogram, the sharpened 2D histogram and the Laplacian-edge 2D histogram.

2. The method of auto white balancing of claim 1, wherein the original image is a linear raw image.

3. The method of auto white balancing of claim 1, further comprising training the neural network using a ground truth patch array.

4. The method of auto white balancing of claim 3, further comprising calibrating a new sensor to the original image utilizing a transformation matrix based on a linear regression of the new sensor to the original image.

5. The method of auto white balancing of claim 1, further comprising training the neural network using a mobile device camera.

6. The method of auto white balancing of claim 1, wherein the original 2D histogram, the Gaussian-blur 2D histogram, the sharpened 2D histogram and the Laplacian-edge 2D histogram have 256 bins in both dimensions.

7. The method of auto white balancing of claim 1, wherein a neural network last layer is a fully connected 256 by 256 and outputs the white balancing gain.

8. The method of auto white balancing of claim 1, wherein a neural network activation function is ReLU.

9. The method of auto white balancing of claim 1, wherein a neural network fully connected layer has leaky ReLU having an alpha of 0.125.

10. The method of auto white balancing of claim 1, wherein the neural network is a U-Net.

* * * * *